(12) United States Patent
Amit et al.

(10) Patent No.: US 8,996,856 B2
(45) Date of Patent: Mar. 31, 2015

(54) SELECTIVE ENCRYPTION IN MOBILE DEVICES

(71) Applicant: Skycure Ltd, Tel-Aviv (IL)

(72) Inventors: Yair Amit, Tel-Aviv (IL); Adi Sharabani, Ramat-Gan (IL)

(73) Assignee: Skycure Ltd, Tel Aviv (IL)

( * ) Notice: Subject to any disclaimer, the term of this patent is extended or adjusted under 35 U.S.C. 154(b) by 0 days.

(21) Appl. No.: 13/917,365

(22) Filed: Jun. 13, 2013

(65) Prior Publication Data

US 2013/0339724 A1     Dec. 19, 2013

Related U.S. Application Data

(60) Provisional application No. 61/660,777, filed on Jun. 17, 2012.

(51) Int. Cl.
*H04L 29/06*     (2006.01)
*H04L 29/08*     (2006.01)

(52) U.S. Cl.
CPC .......... *H04L 63/0272* (2013.01); *H04L 63/168* (2013.01); *H04L 67/02* (2013.01)
USPC ........................................... 713/151; 380/44

(58) Field of Classification Search
CPC ... H04L 67/02; H04L 63/0272; H04L 63/168; H04L 2209/76
See application file for complete search history.

(56) References Cited

U.S. PATENT DOCUMENTS

2004/0006615 A1*   1/2004   Jackson ........................ 709/223
2009/0327695 A1*   12/2009   Molsberry et al. ............ 713/151
2014/0053237 A1*   2/2014   Hopen et al. ...................... 726/1

FOREIGN PATENT DOCUMENTS

EP     1 284 570     2/2003
EP     2453616 A1 *   5/2011   ............ H04W 12/02
EP     2 453 616     5/2012
WO    2007/008849    1/2007

OTHER PUBLICATIONS

International Search Report and Written Opinion for International Application No. PCT/IL2013/050505 mailed Oct. 8, 2013. (18 pages).

\* cited by examiner

*Primary Examiner* — Fikremariam A Yalew
(74) *Attorney, Agent, or Firm* — Tutunjian & Bitetto, P.C.

(57) ABSTRACT

A method, product and system for selective encryption in a mobile device. The method comprising: selectively encrypting requests issued by the mobile device, wherein said selectively encrypting comprises: obtaining a request issued by an application executed by the mobile device, the request having one or more characteristics, the request has a destination; determining, based on the one or more characteristics, whether to encrypt the request; and in response to a determination to encrypt the request, re-routing the request to be transmitted to the destination through a secure channel; whereby the request is encrypted regardless of the destination being a priori associated with the secure channel.

18 Claims, 4 Drawing Sheets

SELECTIVE ENCRYPTION IN MOBILE DEVICES

CROSS-REFERENCE TO RELATED APPLICATION

This application claims the benefit of U.S. Provisional Application No. 61/660,777 filed Jun. 17, 2012, entitled "Selectively encrypting network-traffic with minimal client-side footprint", which is hereby incorporated by reference in its entirety.

TECHNICAL FIELD

The present disclosure relates to computer security in general, and to encryption in mobile devices, in particular.

BACKGROUND

In the mobile domain, Operating Systems (OS), such as mobile OS, the security model is generally much more protective than of that of a traditional OS of desktop systems. In such an OS, programs, also referred to as "apps" may be executed with lower privilege levels and have limited ability to interact and influence the OS as well as other programs. Such a security model may limit the capabilities of security and privacy solutions that are developed for mobile devices, making the device protection task challenging in particular. For example, an iOS™ app cannot monitor and make decisions based on requests sent from other apps on the device.

There are a variety of security and privacy threats (also referred to as threats) that are addressed by security programs. Some of these threats may allow a third party, such as a malicious user, to be able to view the content of a packet sent by the mobile device. Many communication channels used by mobile devices are unsecured, such as use of an unsecured, unencrypted Wi-Fi network, usage of unencrypted protocols such as HTTP and FTP. There may be a variety of threats that result from Man in The Middle (MiTM) attacks. The threats may also be applicable to encrypted networks, such as encrypted Wi-Fi networks, through attacks such as ARP poisoning or the like.

Another potential threat is a threat of content spoofing. A MiTM attacker can not only sniff (e.g., monitor) the traffic of plaintext protocols, it can also meddle with the traffic and present to the victim fraudulent content.

Some applications may implement a functionality that poses a privacy threat, in particular threat to an organization by revealing confidential or sensitive information. This can be due to sending of sensitive information, such as contact lists, calendar meetings, location and/or documents to external servers, in an unsecured manner.

BRIEF SUMMARY

One exemplary embodiment of the disclosed subject matter is a computer-implemented method performed by a mobile device having a processor and memory, the method comprising: selectively encrypting requests issued by the mobile device, wherein said selectively encrypting comprises: obtaining a request issued by an application executed by the mobile device, the request having one or more characteristics, the request has a destination; determining, based on the one or more characteristics, whether to encrypt the request; and in response to a determination to encrypt the request, re-routing the request to be transmitted to the destination through a secure channel; whereby the request is encrypted regardless of the destination being a priori associated with the secure channel.

Optionally, said re-routing comprises sending the request to a proxy server that is a priori associated with the secured channel, wherein the proxy server is configured to transmit the request to the destination.

Optionally, said determining is based on a Uniform Resource Locator (URL) of the request.

Optionally, said determining comprises: determining based on the URL whether an encrypted protocol is utilized and determining to encrypt if the URL utilizes a non-encrypted protocol.

Optionally, the one or more characteristic of the request comprise at least one of: the program initiating the request; a location of the mobile device; and a network used by the mobile device to transmit the request.

Optionally, the method further comprising: receiving a Proxy Auto Config (PAC) file, wherein the PAC file comprises a function configured to select a proxy to a request based on a Uniform Resource Locator (URL) of the request, wherein traffic to the proxy is tunneled through the secure channel; in response to the request, activating the function of the PAC file to perform said determining; and in response to a determination to encrypt the request, selecting the proxy and transmitting the request to the destination via the proxy.

Optionally, the function is configured to select a proxy out of a plurality of proxies, each of which is associated with a security action, wherein a portion of the plurality of proxies is associated with security actions that do not include encryption and wherein another portion of the plurality of proxies is associated with security actions that include encryption.

Optionally, the secure channel is a Virtual Private Network (VPN).

Another exemplary embodiment of the disclosed subject matter is a computer-implemented method performed by a computer having a processor and memory, the method comprising: receiving from a mobile device, an instruction to provide the mobile device with a Proxy Auto Config (PAC) file; wherein the PAC file is to be used by a program of the mobile device when the mobile device is connected to a network; generating a PAC file that comprises a function, wherein the function is configured to receive a Uniform Resource Locator (URL) and return a proxy to handle a request to a destination indicated by the URL, wherein the function is configured to make a determination based on at least one of: the program, the URL, and the network, wherein the proxy is a priori associated with a Virtual Private Network (VPN), whereby regardless of the destination being a priori associated with the VPN, the request is encrypted by re-routing the request through the VPN.

Optionally, the PAC file comprises a function utilizing predetermined rule selection logic, wherein the PAC file retains as a constant value a first value indicative of the program and a second value indicative of the network, wherein the predetermined rule selection logic is configured to utilize at least one of the first and second values to select the proxy.

Optionally, requests by the mobile device are selectively encrypted without having a second program in the mobile device that monitors requests issued in the mobile device.

Yet another exemplary embodiment of the disclosed subject matter is a mobile device having a processor, the processor being adapted to perform the steps of: selectively encrypting requests issued by the mobile device, wherein said selectively encrypting comprises: obtaining a request issued by an application executed by the mobile device, the request having one or more characteristics, the request has a destination; determining, based on the one or more characteristics, whether to encrypt the request; and in response to a determination to encrypt the request, re-routing the request to be transmitted to the destination through a secure channel; whereby the request is encrypted regardless of the destination being a priori associated with the secure channel.

Optionally, said re-routing comprises sending the request to a proxy server that is a priori associated with the secured channel, wherein the proxy server is configured to transmit the request to the destination.

Optionally, said determining is based on a Uniform Resource Locator (URL) of the request.

Optionally, said determining comprises: determining based on the URL whether an encrypted protocol is utilized and determining to encrypt if the URL utilizes a non-encrypted protocol.

Optionally, the one or more characteristic of the request comprise at least one of: the program initiating the request; a location of the mobile device; and a network used by the mobile device to transmit the request.

Optionally, the processor is further adapted to perform: receiving a Proxy Auto Config (PAC) file, wherein the PAC file comprises a function configured to select a proxy to a request based on a Uniform Resource Locator (URL) of the request, wherein traffic to the proxy is tunneled through the secure channel; in response to the request, activating the function of the PAC file to perform said determining; and in response to a determination to encrypt the request, selecting the proxy and transmitting the request to the destination via the proxy.

Optionally, the function is configured to select a proxy out of a plurality of proxies, each of which is associated with a security action, wherein a portion of the plurality of proxies is associated with security actions that do not include encryption and wherein another portion of the plurality of proxies is associated with security actions that include encryption.

Optionally, the secure channel is a Virtual Private Network (VPN).

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
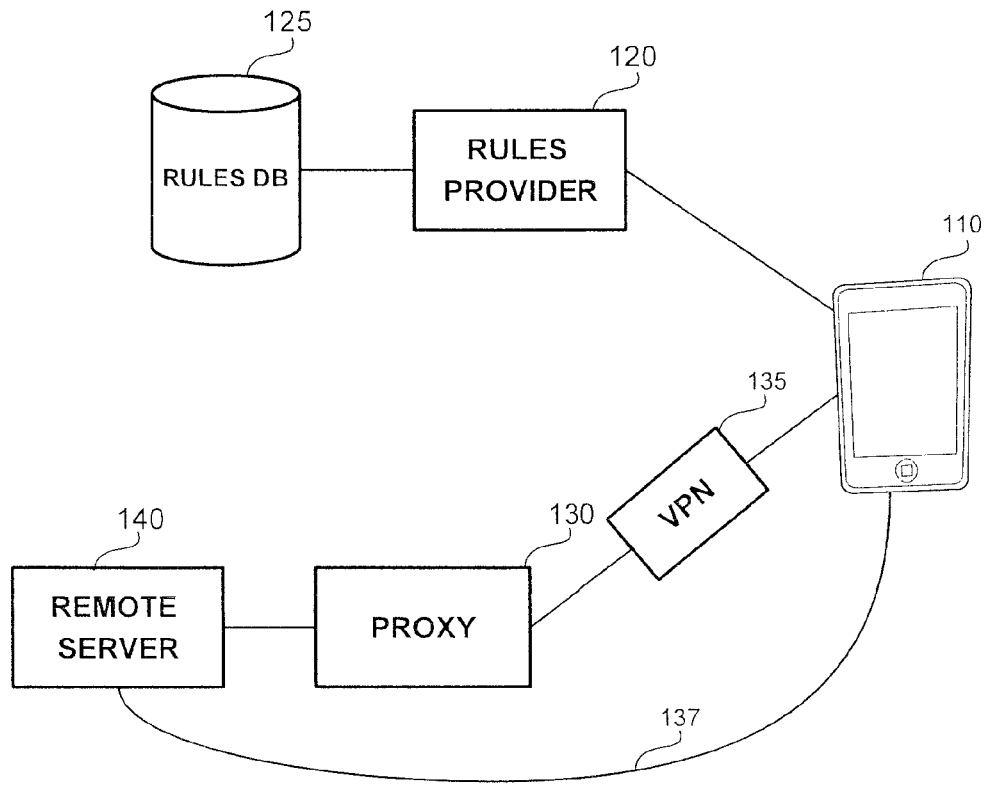
FIGS. 1A and 1B show a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to provide for selective encryption of requests issued by a mobile device. In some exemplary embodiments, the mobile device may be any computing platform having a privilege-limited OS which does not provide any application (external to the OS) to monitor requests by other applications.

Another technical problem is for the selective encryption to be implemented without depleting a battery of a mobile device. The encryption requires monitoring of all requests, on the one hand, and application of potentially computational intensive security logic on the other hand, it may be characterized in high power consumption profile.

As the usage of wireless networks becomes more prominent, there is an increase of threats that relate to lack of encryption of network traffic. Applicants have observed that current devices, and mobile devices in particular, connect to a wide variety of wireless networks, thus increasing the risks of man in the middle (MiTM) attacks. Securing the network layer in such mobile device may be achieved by relying on tunneling the network traffic through a secure channel such as VPN. However, such solutions have the granularity of target Internet Protocol (IP) addresses and lacking insight into the domain-name level or to other characteristics of the request. Therefore, for a given server, the entire traffic is sent through the VPN. As such, and in view of the poor granularity that is supported by VPN, one may route everything through a VPN to ensure that important services are indeed protected.

Such a solution may have many drawbacks.

One drawback relates to scalability. Tunneling a large portion of traffic of thousands of users requires several machines with large Internet network bandwidth and strong CPU power. These requirements are very extensive, and thus such solutions would require substantial amount of resources.

Another drawback relates to user experience. If all traffic is tunneled through a VPN or similar secure channel, performance may be compromised. Users are likely to notice degradation in the latency and speed of their Internet surfing activity.

Another drawback relates to battery performance. Encryption may be a computational intensive activity. Encrypting a large portion of the user's traffic may consume client side CPU, which can result with substantial negative impact on the battery performance.

Another drawback relates to privacy. Tunneling traffic related to personal resources from the user's device through an enterprise logic owned server might compromise the user's privacy, as his information becomes available for inspection by the enterprise. In Bring Your Own Device (BYOD) methodology, where devices are employee-owned, there is a requirement to keep the user's data private even though the device is being used for corporate activity.

One technical solution is to provide selective encryption of specific resources that need to be encrypted, while taking into consideration a variety of parameters, such as the device user, device type, running applications, location of the device, and the networks the device is connected to. The selective encryption encrypts some of the requests issued by the mobile device, based on the characteristics of the requests. If a request is determined to be encrypted, the request is re-routed through a secure channel, such as a VPN. The request is routed through the secure channel even though the original destination of the request is not a priori associated with the secure channel.

A VPN establishes a private network across public networks such as the Internet. It enables a host computer to send and receive data across shared or public networks as if they were an integral part of the private network with all the functionality, security and management policies of the private network. This may be achieved by establishing a virtual point-to-point connection through the use of dedicated connections, encryption, or a combination thereof. Devices, such as a mobile device and a server, are defined as part of a VPN and are identified as part of the VPN based on their IP address.

In some exemplary embodiments, the disclosed subject matter utilizes a VPN system by re-routing a request which has a target destination that is not part of the VPN to a proxy which is part of the VPN. The request is encrypted when transmitted through the secure channel which is provided by the VPN. The proxy, which may be included in the secured VPN, may receive the request after being decrypted by a VPN server. The proxy may then transmit the request to the target destination.

In some exemplary embodiments, the selective encryption is able to determine whether or not to encrypt requests based on various request characteristics. The determination may be based on a Uniform Resource Locator (URL) of the request, such as a domain to which the request is addressed, a protocol being used in the request (e.g., encrypted protocol such as HTTPS, or non encrypted protocol such as HTTP, FTP, or the like), a path within the domain that is being accessed (e.g., /path/ for a URL of the form domain.com/path/), or the like. It will be noted that a domain of a URL is different than an Internet Protocol (IP) address of the server. The domain may be translated to one or more IPs, which may change over time, and which may be different for clients that are located in different geographic locations. Furthermore, as the same server may be used for hosting several domains, the IP may correspond to several different domain names. It may be desired to treat each such domain in a different manner, even though they are hosted on the same sever.

The determination may be based on an app initiating the request. It may be known that an app, such as a game, does not have access to confidential information and hence there may be no need to encrypt any request it issues. Some apps may be deemed as security-important or privacy-important as they have access to confidential, privileged, or private information or resources, or the like. Additionally or alternatively, in case of an organization, some apps may be considered as "private" and the user may not allow the organization to monitor its data, such as for example an email client app that is used for personal purposes. With respect to some apps, it may be known that only some of the requests the apps issue may include confidential information, such as requests issued to specific domains, URLs, or the like.

The determination may be based on a network to which the device is connected. The network may be, for example, a cellular data network (e.g., 3G, GSM EDGE, etc), a Wi-Fi network, a Wireless LAN network, a wired LAN network, or the like. In some exemplary embodiments, based on the network, it may be determined whether to encrypt data being transmitted by the device, such as to mitigate Man in The Middle (MiTM) threats that may be present in the network. As an example, if the mobile device is connected to a public, non-encrypted, Wi-Fi network, encryption may be required. If, on the other hand, the device is connected to an encrypted Wi-Fi network, such as within the enterprise, or another trusted Wi-Fi network, there may be no need to encrypt the requests that will be issued and transmitted via the secure network.

In some exemplary embodiments, the password-protected Wi-Fi networks may still be susceptible to threats. As an example, a malicious user that is also connected to the network might use techniques such as Address Resolution Protocol (ARP) poisoning to route all traffic through his machine and thereby employ MiTM attacks. In addition, the network itself may not be trusted, such as the case with evil twin attacks or other networks utilized for phishing purposes, or in case a device in the network is infected by a malware. In some exemplary embodiments, if the network is password-protected and the credentials of the network are only available to a limited amount of people (e.g., employees), the threat may be considered as mitigated. The disclosed subject matter may therefore determine whether or not to encrypt the communication based on the properties of the network.

Furthermore, some networks may be deemed as more susceptible to MiTM attacks such as networks at air-ports, restaurants or the like.

The determination may be based on a geo-location of the mobile device. In some exemplary embodiments, the geo-location may be determined based on triangulation, based on a GPS receiver, or the like. Additionally or alternatively, the geo-location may be estimated based on a location of a network, such as a Wi-Fi network, to which the network is connected. In some exemplary embodiments, the location may be a precise location, such as within a radius of a few meters from a waypoint. Additionally or alternatively, the location may be a non-precise location such as a region, a city, a neighborhood, a country, or the like. In some exemplary embodiments, requests may be encrypted when the device is located at zones in which MiTM are more prominent, such as near air-port terminals, cafes, restaurants, bus stations, or the like.

The determination may be based on a defined role of a user of the mobile device (e.g., role within the organization), based on the identity of the mobile device (e.g., in case of several clients for the same user), or the like.

Another technical solution is to utilize a Proxy Auto Config (PAC) file in order to selectively route requests to one or more proxy servers, which are a priori associated with a secure channel (e.g., defined as part of a VPN). Hence, any request routed by the PAC file to such a proxy would be encrypted when transmitted. The PAC file may contain a function that is configured to return a proxy server for a given URL. The mobile device may be configured to retrieve the PAC file from a remote server, such as a rules provider server. The mobile device may be further configured to invoke the function of the PAC file in response to a request thereby determining whether the request be handled by a proxy or transmitted directly to a remote server without being encrypted by the disclosed subject matter. In some exemplary embodiments, the function is a JavaScript function named FindProxyForURL and is configured to receive two parameters: a URL and a host. However, the disclosed subject matter is not limited to such an embodiment.

In some exemplary embodiments, a PAC file may be used for each app of the mobile device. Additionally or alternatively, in each network, a different PAC may be defined. The PAC file may be dynamically generated to include information that is not passed via parameters, such as an identifier of the mobile device, a role of the user, the app initiating the request, the network to which the mobile device is connected, or the like. During the dynamic generation of the PAC additional information may be obtained and retained in constants in the PAC file to be used upon invocation of the PAC file.

In some exemplary embodiments, a plurality of proxy servers may be utilized. Some proxies may be a priori associated with an encrypted channel while other may be associated with a non-encrypted channel. Additionally or alternatively, each proxy may be a priori associated with a security action, such as but not limited to: forward the request to the target server, block the request, close a connection, perform a redirection, encrypt the request, modify the request, or the like.

In one embodiment, some requests may be transmitted to a proxy that is associated with a secure channel. Those requests may be, therefore, encrypted and transmitted in a secure manner to the proxy, overcoming MiTM threats in the network through which the requests are transmitted. The proxy may receive the request and decrypt it. The request may then be forwarded to the target destination. However, the proxy may, in addition, determine that encryption is required for the second leg as well. In some cases, encryption would be required only to one of the legs, to both, or to none.

It will be noted that in some embodiments, a VPN server may decrypt the request instead of the proxy server. The VPN server may reside on the same machine as the proxy server or in another machine which has a secured connection to the proxy server.

In one embodiment, if the request is directed to a URL which indicates a non-encrypted protocol (e.g., HTTP), and the URL has a counterpart URL making use of an encrypted protocol (e.g., HTTPS), the request may be sent via the secure channel and redirected by the proxy to the counterpart URL. As an example, instead of accessing a URL at "email.com" using HTTP, the proxy may access a counterpart URL at "email.com/secured/" using HTTPS. Additionally or alternatively, the proxy may transmit a response to the mobile device redirecting future traffic to the counterpart URL, such as by employing a 302 redirection, or a similar technique. It will be noted that such a redirection may provide for better performance than tunneling the requests through a VPN as redirection to HTTPS would allow transmitting the rest of the communication directly to the target server, without having to reroute it through proxy servers.

One technical effect of utilizing the disclosed subject matter is providing for selective encryption of network traffic which utilizes a relatively limited client-side footprint. The limited footprint includes, for example, relatively low computational requirements, power consumption, or the like.

In some exemplary embodiments, the disclosed subject matter may be combined with that subject matter disclosed in U.S. Provisional Application No. 61/660,773 filed Jun. 17, 2012, entitled "Granular network access control with minimal client-side footprint", by the same Applicant, and in a Non-provisional U.S. application of the aforementioned provisional application, entitled "Access Control System For A Mobile Device", that is filed concurrently with the present application, both of which are hereby incorporated by reference in their entirety. The proxy may be enhanced to perform predetermined security actions, thereby the selection of the proxy provides for both selective encryption of the requests transmitted by the mobile device and application of predetermined security actions on the requests by the proxy.

Referring now to FIG. 1A showing a computerized environment in which the disclosed subject matter is used, in accordance with some exemplary embodiments of the subject matter.

A Device 110, such as a smart phone, a Personal Digital Assistant (PDA), a tablet computer, a laptop, or the like, may be connected to a network (not shown). Device 110 may be connected to a Wi-Fi network, a cellular network, a wired network, or the like, through which Device 110 can communicate with servers, such as a Remote Server 140. Remote Server 140 may be, for example, a web server, a server configured to provide access to remote or shared resources, or the like. In some exemplary embodiments, Remote Server 140 may contain privileged or confidential information, such as information of an organization.

A Rules DB 125 may be a database retaining security related rules. The rules may define under which circumstances a request should be transmitted via a secure channel, such as VPN 135, instead via non-secure channel, Channel 137. Rules DB 125 may be retained by Rules Provider 120, by Device 110, or may be retained in a remote server. In some exemplary embodiments, a rule may define, based on a characteristic of the request, whether or not to encrypt the request. In some exemplary embodiments, the characteristic may include a URL (or portion thereof) of the resource being accessed, a protocol utilized by the URL, an app of Device 110 initiating the request, a network to which Device 110 is connected or through which the request may be transmitted, a user id associated with the request, an identification of Device 110 that performs the request, a geo-location of Device 110 from which the request is initiated or an estimation thereof, and the like. It will be noted that the IP address to which the request is transmitted, based on URL resolution, such as by a Domain Name Server (DNS), is not part of the characteristic of the request as it may depend upon a routing table in the network, may be different for the same request if operated at different times or from different locations, and may be identical to different requests which access the same physical server over the network (e.g., a server that hosts two different domains). In some exemplary embodiments, the request may contain, in its URL a predetermined IP address to which the request is located. Such an IP address may be considered as part of the characteristic of the request as it is independent of the DNS, routing tables and similar objects that are external to the request, and is explicitly defined by the request itself.

In some exemplary embodiments, Rules DB 125 may allow for enhanced and flexible policies, which may be different for different organizations, different users in the same organization and for different devices of the same user.

The following are non limiting examples of rules:

Encrypt requests sent to URL "public.web.mail/login" using HTTP.

Encrypt requests sent to URL "m.server.com/postCurrentLocation" using HTTP, from app "mobileApplication" of user "skycure" in network that is not "office-network".

Encrypt requests sent to URL that matches the pattern: "http://*.google.com/*" and return 302 redirection to its HTTPS scheme form. Such a rule may guarantee that all HTTP-based traffic initiated by the client device to *.google.com is secure, regardless to the client side software logic, which may try to initiate non-encrypted requests in its own logic.

Encrypt all requests from application "MobileSafari" when in a predetermined perimeter around a specific geo-location, such as 20 km around a given coordinate. For example, such a rule may be useful for areas such as airports that are known to have high risk of wireless network attacks.

In some exemplary embodiments, the rules of Rules DB 125 may be defined manually by an administrator (not shown) may be based on known security issues and optionally a-priori provided. In some exemplary embodiments, the administrator may determine encryption to be performed at different granular levels. The encryption may be performed for all apps, a portion of the apps, a specific app. Additionally or alternatively, the encryption decision may depend on specific network to which Device 110 is connected, the location of Device 110, the identity of the user using Device 110 and his role in the organization, the identity of the device in case the same user is associated with several devices, or the like.

In some exemplary embodiments, the Rules DB 125 may also define rules that determine whether to perform a security action in response to a request. The security action may be, for example, tunneling the request to be monitored and analyzed, modifying the request, blocking the request, responding to the request by the proxy or the like. In some exemplary embodiments, one or more proxies, such as Proxy 130, may be associated with the security action. Each such proxy may be configured to perform a predetermined security action when receiving a request. In case a rule requires a specific security action, the request may be tunneled through the proxy to perform the security action.

In some exemplary embodiments, Rules Provider 120 may be configured to provide the rules to Device 110 or relevant portions thereof. Rules Provider 120 may be a server accessible by Device 110. In some exemplary embodiments, the Rules Provider 120 may be configured to provide a PAC file to Device 110. The PAC file may be served using any file serving techniques (e.g., HTTP, FTP, HTTPS, local file access, or the like). Rules Provider 120 may dynamically generate a PAC file for Device 110. In some exemplary embodiments, each application may be served with a different PAC file and thereby each PAC file may be dynamically generated so as to relate to the app to which it is associated. Additionally or alternatively, each app may be served with a different PAC file in each connected network, thereby allowing the PAC file to be associated with an app and a network and include the relevant rules thereto. In some exemplary embodiments, rules can be dynamic, based on the user, its role(s), client device identifier, application, geo-location, the network the device is connected through, or the like. Serving a different PAC file for different scenarios may allow the system to gain high granularity in its policies.

In some exemplary embodiments, Device 110 may be configured, such as by a configuration app, to request the PAC file from Rules Provider 120. The request of the PAC file may include passing to Rules Provider 120 information relating to relevant parameters, such as the network, its estimated location (e.g., for a wired network or wireless network of limited range such as a Wi-Fi network), the app, the user and its role(s), the device identification, or the like. In some exemplary embodiments, Device 110 may request the PAC file from Rules Provider 120 using an HTTP or HTTPS request which may use GET or POST parameters to provide such information.

In some exemplary embodiments, upon initiating a request by Device 110, the rules provided to Device 110 (e.g., the PAC file) may be applied on the request to determine whether to direct the request directly to Remote Server 140 via Channel 137 or whether to tunnel the request through VPN 135 by redirecting it to Proxy 130. By having a plurality of proxies, each proxy may also be associated with a different security action thereby allowing selection from a plurality of potential security actions in addition to the determination to tunnel the request via VPN 135.

In some exemplary embodiments, Device 110 may initiate a plurality of requests, some may be transmitted directly to their destination via Channel 137 and some may be tunneled through VPN 135. Each request may be handled differently based on its characteristic and based on the rules provided to Device 110.

Figure 1B:
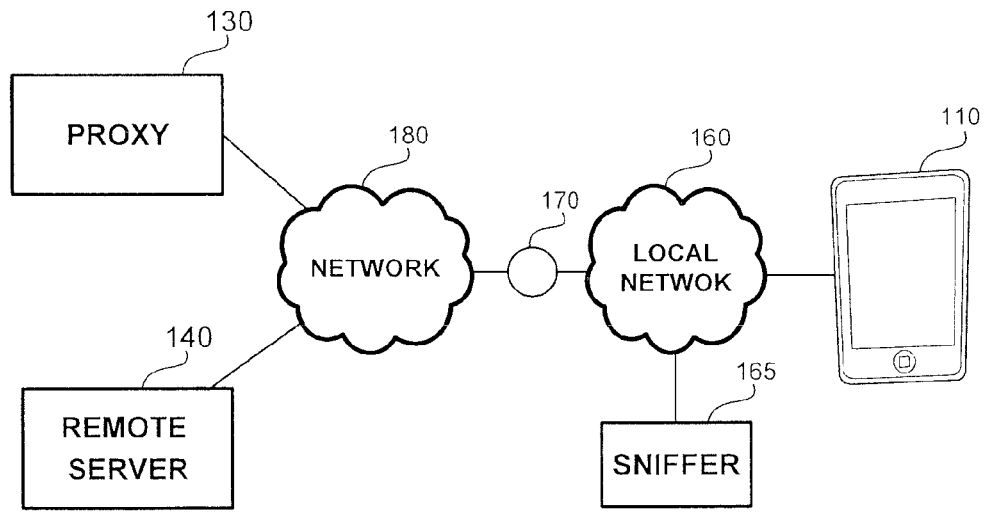

Referring now to FIG. 1B showing a computerized environment in which the disclosed subject matter is used, in accordance with some exemplary embodiments of the subject matter.

Device 110 is connected to a Local Network 160, such as a Wi-Fi network, through which Device 110 is connected to a Network 180, such as the Internet, an intranet, or the like. Connectivity from Local Network 160 to Network 180 is achieved via a Node 170, such as a router, a switch, a bridge, or the like.

Both Proxy 130 and Remote Server 140 are connected (directly or indirectly via other local networks which are not shown) to Network 180.

The disclosed subject matter may replace a transmission directly from Device 110 to Remote Server 140 to a transmission that is comprised of two legs. During the first leg, the request is transmitted from Device 110 to Proxy 130 and during the second leg, the request is transmitted from Proxy 130 to Remote Server 140. In some exemplary embodiments, the communication over the first leg may be encrypted thereby avoiding any MiTM or similar threats that are present with respect to Local Network 160. As an example to a threat, a Sniffer 165 may be present in Local Network 160. Sniffer 165 may monitor all communications in Local Network 160, such as in the case of a non-secured Wi-Fi network, networks susceptible to ARP poisoning attacks. dedicated malicious networks such as in evil twin attacks, or the like. Therefore, the content of any request that is not encrypted may be visible to Sniffer 165. Encrypting the request over the first leg mitigates the threat by Sniffer 165. Even if the second leg is performed without encrypting the request, Sniffer 165 may not be able to view the content of the request as Sniffer 165 may be limited in its ability to only sniff packets transmitted in Local Network 160 and not in any remote network, such as Network 180. In some exemplary embodiments, the request may also be encrypted during the second leg.

Figure 2:
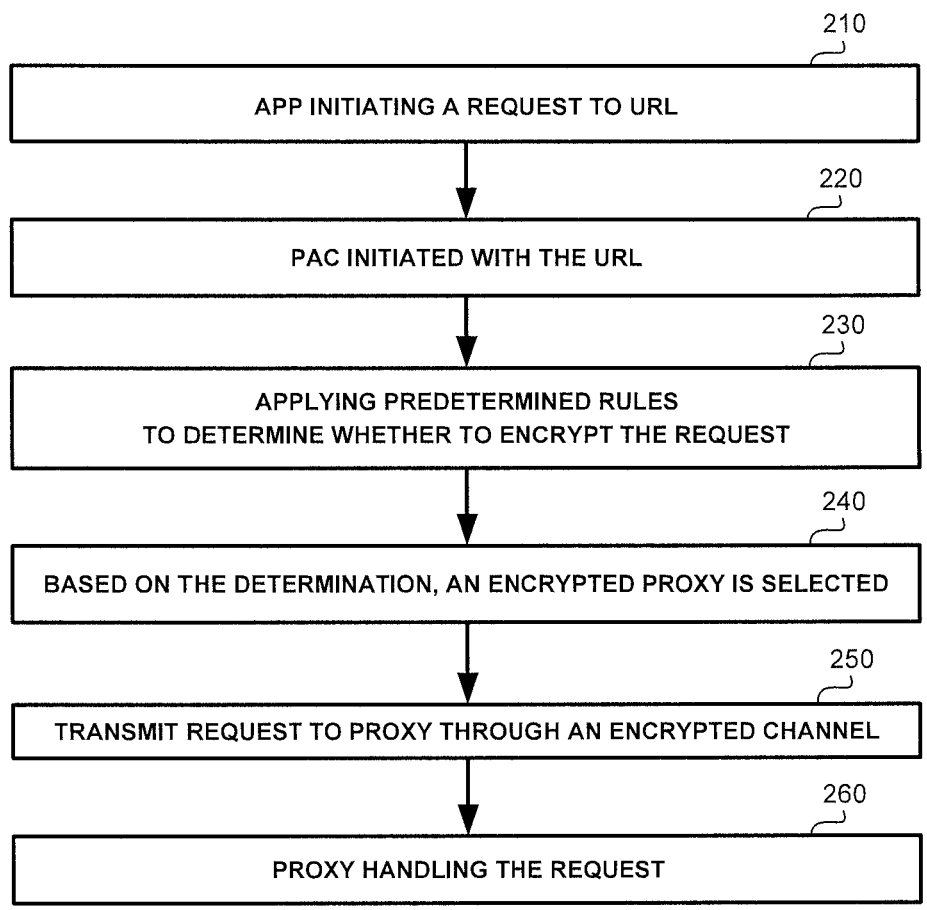
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter. In some exemplary embodiments, the method of FIG. 2 may be performed by a device, such as 110 of FIG. 1A.

In Step 210, an app may initiate a request to a resource. The request may be associated with a URL.

In Step 220, Proxy Auto Configuration (PAC) may be initiated with the URL. The PAC may be implemented by a function in a PAC file that receives the URL and returns the proxy to be used. In some exemplary embodiments, the function may be configured to receive in addition to the URL a host.

In Step 230, the rules of the PAC may be applied to determine whether to encrypt the request. In some exemplary embodiments, the rules may be provided by a Rules Provider. In some exemplary embodiments, the rules may take into account request characteristics such as but not limited to user role, device id, connected network, app initiating the request, location of the device, or the like.

In some exemplary embodiments, PAC may be implemented by a PAC file. In some exemplary embodiments, the PAC file may be a unique PAC file for the app and therefore its determination may take into account in its decision the identity of the app that initiates the request. Additionally or alternatively, the PAC file may be a unique PAC file for the app when the device is connected to the network, and therefore may take into account the identity of the network through which the request will be transmitted.

Information required for PAC may be obtained when PAC is initiated (e.g., URL and host), a-priori retained by the PAC implementation (e.g., constant values in the PAC file identifying the user's role, the app, the network, approximate position of the network, or the like), dynamically obtained (e.g., utilizing GPS to determine current location), combination thereof or the like.

In Step 240, based on the determination to encrypt the request, a proxy that is associated with a secure channel may be selected. In case the determination is not to encrypt the request, no proxy may be selected or alternatively, a proxy that is not associated with a secure channel may be selected.

In Step 250, and in case a proxy is selected, the request may be transmitted to the selected proxy through a secured channel, such as a VPN.

In some exemplary embodiments, as the proxy is a priori associated with the VPN, transmitting the request to the proxy initiates the VPN system of the mobile device which may perform client-side encryption of the request and transmit the encrypted request to the proxy. Once the request is received, it may be decrypted and its content may be accessible to the proxy. The encryption may therefore be performed seamlessly, without any user intervention and without requiring any additional app to monitor requests in addition to the Operating System and potentially a VPN application which does not provide for selective encryption but rather full tunneling encryption to predetermined targets.

In Step 260, the proxy may handle the request. In some exemplary embodiments, the proxy server may decide, based on the content of the request, its characteristic, or the like, to transmit the request to its destination, to block the request, to modify the request and transmit the modified request, or the like. In some exemplary embodiments, the proxy server may decide to respond to the client on behalf of the server. As one non-limiting example, the proxy server may determine to enforce an HTTPS scheme over an HTTP scheme, such as in case the destination supports both schemes or in case there is an alternative destination that is functionally equivalent to the destination which supports HTTPS requests. In such a case, the proxy server may respond to the client with a command to initiate a redirection, such as 301, 302 or 307 redirections. Other actions may include different security-related responses other than redirection invocations.

In some exemplary embodiments, the request may be modified to be directed to a different URL, to utilize a different protocol, to include different content (e.g., different configuration, redacted file, or the like).

Figure 3:
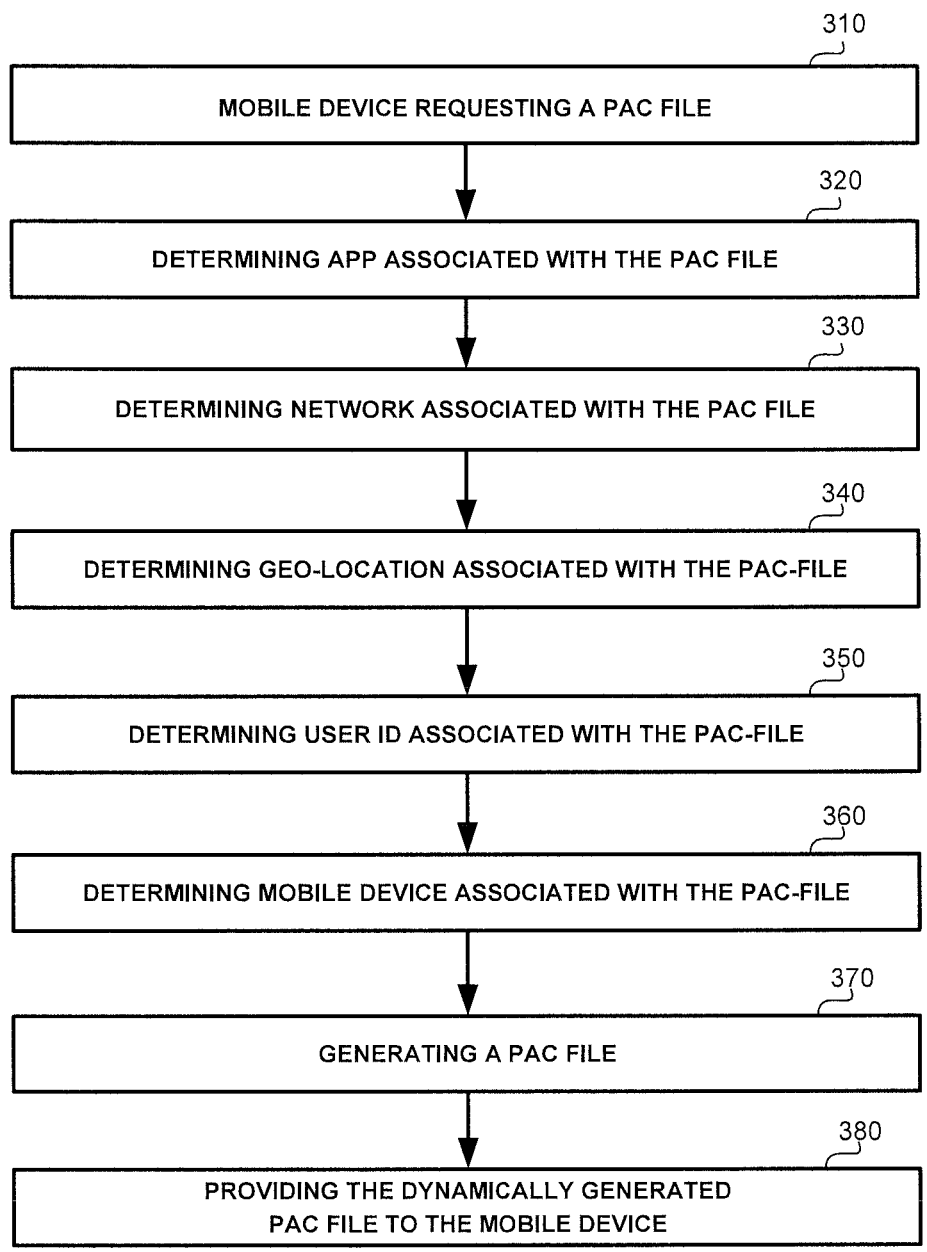
FIG. 3 shows a flowchart diagram of a method, in accordance with some exemplary embodiments of the disclosed subject matter.

Referring now to FIG. 3 showing a flowchart diagram of a method, in accordance with some exemplary embodiments of the disclosed subject matter. The method of FIG. 3 may be performed by a Rules Provider, such as 120 of FIG. 1A.

In Step 310, a device, such as a mobile device, may request a PAC file.

In Step 320, the app that is associated with the PAC file may be determined. The identity of the app may be determined, for example, based on information provided in the request of Step 310, such as POST or GET parameters, or the like. Additionally or alternatively, the request may comprise headers, such as HTTP headers. The request headers may be utilized to identify the app. For example, a user-agent header field may include an identification of the app initiating the request.

In Step 330, the network associated with the PAC file may be determined. In some exemplary embodiments, the network is determined based on information provided in the request.

In Step 340, geo-location associated with the PAC file may be determined. The geo-location may be a location or a proximate location of the network. In some exemplary embodiments, the location may be provided in the request.

In Step 350, a user id associated with the PAC file may be determined. The user id may be an identification of the user using the device. Based on the user id, a role of the user in an organization may be determined thereby allowing to apply for users having similar roles, similar rules. In some exemplary embodiments, the user identification and/or role may be provided in the request.

In Step 360, a mobile device that is associated with the PAC file may be determined. A single user may utilize several devices, such as a laptop, a tablet and a mobile phone, each of which may be associated with similar yet different rules. The mobile device identification may be determined. In some exemplary embodiments, the identification of the mobile device may be provided in the request.

In some exemplary embodiments, in any of Steps 320-360, the information may be obtained from the request of Step 310. Additionally or alternatively, the information may be determined by the Rules Provider, such as determining the user's roles based on the user identification, initiating a request to an app installed on mobile device to determine current location, current connected network, or the like.

In Step 370, a PAC file may be generated. In some exemplary embodiments, the PAC file may include a function operative to receive a URL and a host and return a proxy based on application of rules. In some exemplary embodiments, the function may implement only rules that are applicable to the device in accordance with the information obtained in Steps 320-360.

In some exemplary embodiments, the function may be generated so as to include constant values that indicate the information obtained in Steps 320-360 and be used when applying the rules. In such an embodiment, each rule may be implemented as function that is configured to receive the information using one or more parameters. The PAC function may include a constant assignment section, which is generated based on the values determined in steps 320-360, and invocation section which invokes the relevant functions and providing the function the constant information. In some exemplary embodiments, some information, such as geo-location in a cellular network, may not be constant and a-priori known and may be dynamically determined upon invocation of the PAC function.

The PAC function may be configured to determine whether or not to encrypt a request. In the event that a request should be encrypted, the function may select a proxy that is a priori associated with a VPN or other secure channel, to handle the request. Hence, regardless of the destination of the request, which may or may not be a priori associated with the VPN, the request is re-routed through the VPN and consequently encrypted.

In Step 380, the dynamically generated PAC file may be served to the device to be employed by the device in response to invocations of requests.

Figure 4A:
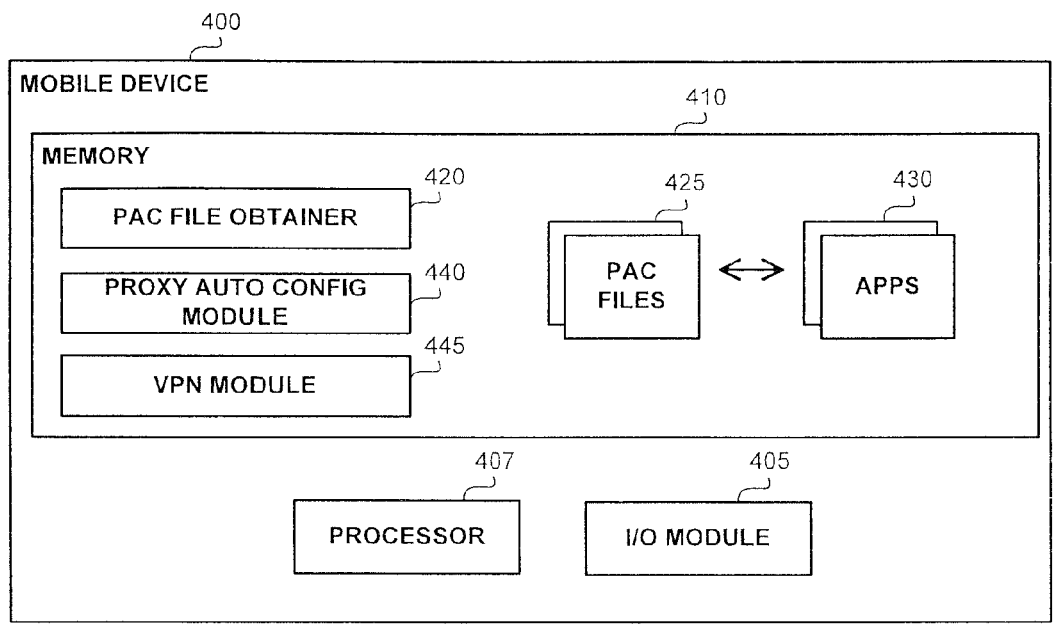
FIG. 4A-4C show block diagrams of apparatuses, in accordance with some exemplary embodiments of the disclosed subject matter.

Referring now to FIG. 4A showing a block diagram of an apparatus, in accordance with some exemplary embodiments of the disclosed subject matter. Mobile Device 400 may be a device such as 110 of FIG. 1A and may be configured to perform steps of the method of FIGS. 2 and 3.

In some exemplary embodiments, Mobile Device 400 may comprise a Processor 407. Processor 407 may be a Central Processing Unit (CPU), a microprocessor, an electronic circuit, an Integrated Circuit (IC) or the like. Processor 407 may be utilized to perform computations required by Mobile Device 400 or any of it subcomponents.

In some exemplary embodiments of the disclosed subject matter, Mobile Device 400 may comprise an Input/Output (I/O) Module 405. I/O Module 405 may be utilized to provide an output to and receive input from a user. I/O Module 405 may be configured to provide network connection to Mobile Device 400, to allow connectivity to servers such as a rules provider (e.g. 120), a proxy (e.g., 130), and a remote server (e.g., 140).

In some exemplary embodiments, Mobile Device 400 may comprise a Memory 410. Memory 410 may be a hard disk drive, a Flash disk, a Random Access Memory (RAM), a memory chip, or the like. In some exemplary embodiments, the Memory 410 may retain program code operative to cause Processor 407 to perform acts associated with any of the subcomponents of Apparatus 400 and/or steps of FIGS. 2-3.

PAC File Obtainer 420 may be configured to obtain a PAC file from a server, such as a rules provider. PAC File Obtainer 420 may be configured to issue a request for a PAC file (Step 310). PAC File Obtainer 420 may be configured to provide the server generating the PAC file with information such as the app for which the PAC file will be used, the network, the user id, the device id, the geo-location, or the like. In some exemplary embodiments, PAC File Obtainer 420 may obtain PAC files 425 each of which may be predetermined to be associated with an app of Apps 430. In some exemplary embodiments, a single app may be associated with a plurality of PAC files, each of which associated with a specific network.

Proxy Auto Configuration (PAC) Module 440 may be configured to perform PAC, such as using PAC Files 425. In some exemplary embodiments, PAC Module 440 may be configured to invoke a PAC function of a relevant PAC file for a request, such as a PAC file that is associated with the app initiating the request and the network to which Mobile Device 400 is connected.

VPN Module 445 may enable Mobile Device 400 to participate in a VPN. VPN Module 445 may be configured to encrypt outgoing packets so as to allow only an intended recipient, or optionally members of the VPN, to be able to decrypt the packets. Accordingly, VPN Module 445 may be configured to decrypt incoming packets received from other members of the VPN.

In some exemplary embodiments, VPN Module may be configured to identify whether an outgoing request is directed to a server that is part of a VPN. In case such request is identified, VPN Module 445 may encrypt the request thereby providing a secure channel for communication within the VPN. In some exemplary embodiments, VPN Module 445 may determine whether an outgoing request is directed to a server that is part of a VPN based on an IP address to which the request is directed after URL resolution is performed. Therefore, the VPN Module 445 in itself may not provide for selective encryption of requests based on characteristics of the request.

Figure 4B:
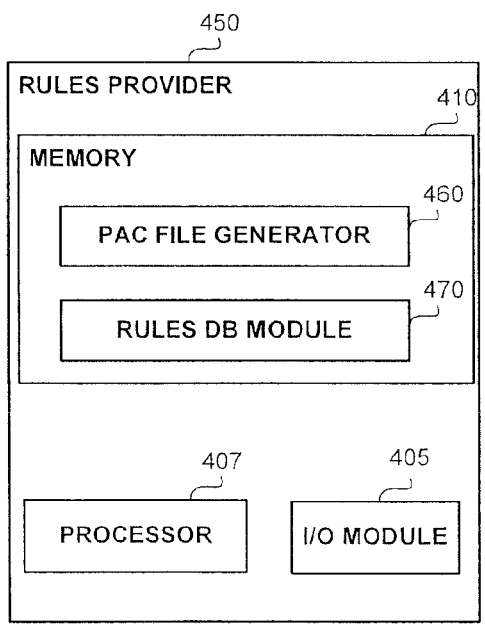

Referring now to FIG. 4B showing a block diagram of an apparatus, in accordance with some exemplary embodiments of the disclosed subject matter. Rules Provider 450, such as 120 of FIG. 1A, may be configured to perform steps of the method of FIG. 3. Similarly to Mobile Device 400, Rules Provider 450 may comprise Processor 407, I/O Module 405, and Memory Unit 410.

PAC File Generator 460 may be configured to generate a PAC file. Generation may be performed such as by performing steps 320-380 of FIG. 3. The PAC file may be generated based upon rules that may be retained in a Rules DB, such as 125. A Rules DB Module 470 may be utilized to obtain relevant rules from a rules DB (not shown) which may be a local server, a remote server, or the like.

Figure 4C:
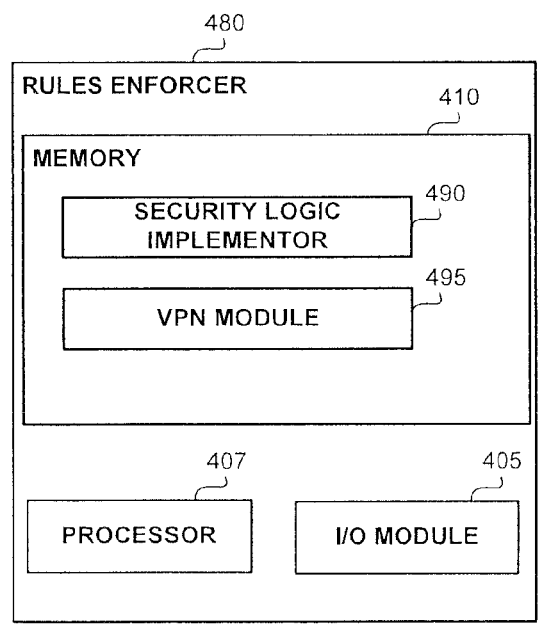

Referring now to FIG. 4C showing a block diagram of an apparatus, in accordance with some exemplary embodiments of the disclosed subject matter. Rules Enforcer 480 may be a proxy, such as Proxy 130 of FIG. 1A. Similarly to Mobile Device 400, Rules Enforcer 480 may comprise Processor 407, I/O Module 405, and Memory Unit 410.

Rules Enforcer 480 may be a priori associated with a VPN and transmission from Mobile Device 400 to Rules Enforcer 480 may be transmitted over a secure channel.

Rules Enforcer 480 may comprise a VPN Module 495 similar to VPN Module 445. VPN Module 495 may be configured to decrypt packets received from other members of the VPN, such as Mobile Device 400, and to encrypt packets that are directed to other members of the VPN. Additionally or alternatively, Rules Enforcer 480 can be part of the secured network and therefore it may not need to have VPN Module 495 installed thereon. In such an embodiment, a VPN server is in charge of encrypting any packet exiting the secured network (e.g., to nodes such as Mobile Device 400) and decrypting any packet entering the secured network, while communication within the secured network is performed in a non-encrypted manner.

A Security Logic Implementor (SLI) 490 may be configured to perform a predetermined security action. In some exemplary embodiments, the Rules Enforcer 480 may be associated with one or more security action and may perform the security actions upon receipt of a request. SLI 490 may block certain requests, such as all requests received by Rules Enforcer 480, request containing unauthorized data, or the like. Additionally or alternatively, SLI 490 may modify a request and transmit the modified request to the target server. Additionally or alternatively, SLI 490 may transmit a response instead of forwarding the request to the target server, such as for exampling redirecting the client to another URL. The other URL may be an HTTPS version of the requested URL. Additionally or alternatively, SLI 490 may generate a response to the request, such as a 302 redirection response.

Additionally or alternatively, SLI 490 may determine, such as based on the characteristics of the request, the content of the request, or the like, that the request is permitted and transmit it to the target server.

In some exemplary embodiments, SLI 490 may implement computational intensive logic. Such logic may be associated with relatively high resource consumption (e.g., CPU time, memory, power, or the like). Therefore, some computations that can be performed by the Device 110 may be performed by Rules Enforcer 480. As an example, in some embodiments, SLI 490 may be configured to complete application of the security rules of the Rules DB. Mobile Device 400 may be configured to apply a coarse application of the rules and the Rules Enforcer 480 may complete the application of the rules thereby avoiding relatively high client-side footprint and reducing resources consumed by the Mobile Device 400 for the security and privacy related tasks of the disclosed subject matter.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a mobile device having a processor and memory, the method comprising:

receiving a dynamically generated Proxy Auto Config (PAC) file, the PAC file is generated automatically by a rules provider, wherein the rules provider selects one or more rules from a rules database to be applied by the PAC file, wherein the one or more rules are rules useful for determining whether or not to encrypt a request issued by the mobile device;

selectively encrypting requests issued by the mobile device, wherein said selectively encrypting comprises:

obtaining a request issued by an application executed by the mobile device, the request having one or more characteristics, the request has a destination;

determining, based on the one or more characteristics, whether to encrypt the request, wherein said determining is performed by applying the rules in the PAC file; and in response to a determination to encrypt the request, re-routing the request to be transmitted to the destination through a secure channel, wherein said re-routing the request is performed by sending the request to a proxy defined by the PAC file, wherein traffic to the proxy is tunneled through the secure channel;

whereby the request is encrypted regardless of the destination being a priori associated with the secure channel.

2. The computer-implemented method of claim 1, wherein said re-routing comprises sending the request to a proxy server that is a priori associated with the secured channel, wherein the proxy server is configured to transmit the request to the destination.

3. The computer-implemented method of claim 1, wherein said determining is based on a Uniform Resource Locator (URL) of the request which is an outgoing request from the mobile device.

4. The computer-implemented method of claim 3, wherein said determining comprises: determining by examining the URL of the outgoing request whether an encrypted protocol is utilized and determining to encrypt if the URL utilizes a non-encrypted protocol.

5. The computer-implemented method of claim 1, wherein the one or more characteristic of the request based upon which said determination to encrypt the request is performed, comprise at least one of:
the program initiating the request;
a location of the mobile device; and
a network used by the mobile device to transmit the request.

6. The computer-implemented method of claim 1, wherein the PAC file is configured to select a proxy out of a plurality of proxies, each of which is associated with a security action, wherein a portion of the plurality of proxies is associated with security actions that do not include encryption and wherein another portion of the plurality of proxies is associated with security actions that include encryption.

7. The computer-implemented method of claim 1, wherein the secure channel is a Virtual Private Network (VPN).

8. The computer-implemented method of claim 1, wherein the request is an HTTP request to a server, wherein a HTTPS request is available as an alternative to the HTTP request, wherein the proxy is configured to receive the HTTP request and provide a redirection response to the mobile device to cause a the mobile device to issue the alternative HTTPS request.

9. A computer-implemented method performed by a computer having a processor and memory, the method comprising:
receiving from a mobile device, an instruction to provide the mobile device with a Proxy Auto Config (PAC) file; wherein the PAC file is to be used by a program of the mobile device when the mobile device is connected to a network;
generating a PAC file that comprises a function, wherein the function is configured to receive a Uniform Resource Locator (URL) and return a proxy to handle a request to a destination indicated by the URL, wherein the proxy is a priori associated with a Virtual Private Network (VPN), whereby regardless of the destination being a priori associated with the VPN, the request is encrypted by re-routing the request through the VPN, wherein said generating comprises:
automatically selecting one or more rules from a rules database, wherein the one or more rules are rules useful for determining whether or not to encrypt a request issued by the mobile device;
generating the function so that the function will apply the one or more rules when the function is invoked.

10. The computer-implemented method of claim 9, wherein the PAC file comprises a function utilizing predetermined rule selection logic, wherein the PAC file retains as a constant value a first value indicative of the program and a second value indicative of the network, wherein the predetermined rule selection logic is configured to utilize at least one of the first and second values to select the proxy.

11. The computer-implemented method of claim 9, whereby requests by the mobile device are selectively encrypted without having a second program in the mobile device that monitors requests issued in the mobile device.

12. A mobile device having a processor, the processor being adapted to perform the steps of:
receiving a dynamically generated Proxy Auto Config (PAC) file, the PAC file is generated automatically by a rules provider, wherein the rules provider selects one or more rules from a rules database to be applied by the PAC file, wherein the one or more rules are rules useful for determining whether or not to encrypt a request issued by the mobile device;
selectively encrypting requests issued by the mobile device, wherein said selectively encrypting comprises:
obtaining a request issued by an application executed by the mobile device, the request having one or more characteristics, the request has a destination;
determining, based on the one or more characteristics, whether to encrypt the request, wherein said determining is performed by applying the rules in the PAC file; and
in response to a determination to encrypt the request, re-routing the request to be transmitted to the destination through a secure channel, wherein said re-routing the request is performed by sending the request to a proxy defined by the PAC file, wherein traffic to the proxy is tunneled through the secure channel;
whereby the request is encrypted regardless of the destination being a priori associated with the secure channel.

13. The mobile device of claim 12, wherein said re-routing comprises sending the request to a proxy server that is a priori associated with the secured channel, wherein the proxy server is configured to transmit the request to the destination.

14. The mobile device of claim 12, wherein said determining is based on a Uniform Resource Locator (URL) of the request which is an outgoing request from the mobile device.

15. The mobile device of claim 14, wherein said determining comprises: determining by examining the URL of the outgoing request whether an encrypted protocol is utilized and determining to encrypt if the URL utilizes a non-encrypted protocol.

16. The mobile device of claim 12, wherein the one or more characteristic of the request based upon which said determination to encrypt the request is performed, comprise at least one of:
the program initiating the request;
a location of the mobile device; and a network used by the mobile device to transmit the request.

17. The mobile device of claim 16, wherein the PAC file is configured to select a proxy out of a plurality of proxies, each of which is associated with a security action, wherein a portion of the plurality of proxies is associated with security actions that do not include encryption and wherein another portion of the plurality of proxies is associated with security actions that include encryption.

18. The mobile device of claim 12, wherein the secure channel is a Virtual Private Network (VPN).

\* \* \* \* \*